Figure 1:
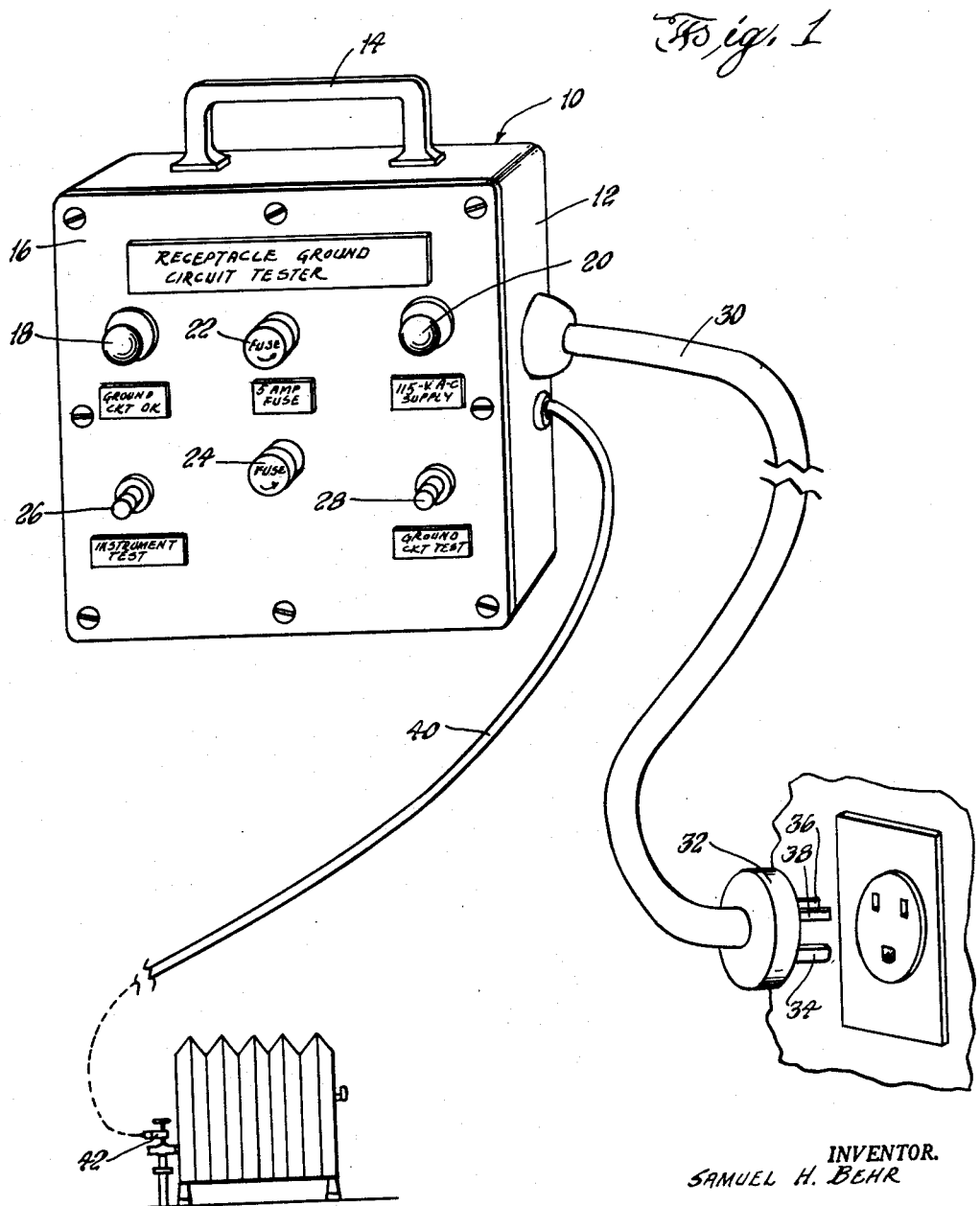

March 30, 1965    S. H. BEHR    3,176,219
ELECTRIC OUTLET GROUND CIRCUIT TEST INSTRUMENT
HAVING RELAY MEANS RESPONSIVE TO
A PREDETERMINED CURRENT FLOW
Filed June 26, 1961    3 Sheets-Sheet 2

INVENTOR.
SAMUEL H. BEHR
BY Arthur L. Bowers
AGENT
Max L. Farmer
ATTORNEY

United States Patent Office

3,176,219
Patented Mar. 30, 1965

1

3,176,219
ELECTRIC OUTLET GROUND CIRCUIT TEST INSTRUMENT HAVING RELAY MEANS RESPONSIVE TO A PREDETERMINED CURRENT FLOW
Samuel H. Behr, 1046 Pembroke St., Uniondale, N.Y.
Filed June 26, 1961, Ser. No. 119,742
6 Claims. (Cl. 324—51)
(Granted under Title 35, U.S. Code (1952), sec. 266)

The invention described herein may be manufactured and used by or for the Government of the United States of America for governmental purposes without the payment of any royalties thereon or therefor.

This invention relates to an electrical continuity test instrument and more particularly to an instrument to detect faults in a power outlet ground connection.

The power outlet referred to may be in a direct current power supply system wherein either the positive or negative leg of the system is grounded or wherein the entire system is electrically insulated from ground or the power outlet referred to may be in an alternating current system having a grounded leg or wherein the entire system is electrically insulated from ground. This invention while not limited thereto has special utility in comparatively low voltage, 110–125 volt systems utilizing three-terminal outlets wherein one outlet terminal is included as a ground connection. This type of outlet is polarized and the ground terminal is readily distinguishable from the other two terminals. An electrical connector designed for mating with this type of outlet has three correspondingly polarized terminals. The ground terminals of connector and outlet contribute a vital safety factor against electric shock hazards when properly and fully utilized.

Any type of electrical device having outerparts of conductive material expose the user to possible shock hazard. If the outside conductive parts of the device are joined by a conductive path to an energized part of the device either as a result of deterioration of insulation or mistake in wiring or by any other circumstance, and if there is a low resistance conductive path from the user to ground electric current may pass from the exposed conductive part of the device through the user's body to ground. Cases and handles are the most common examples of outer conductive parts of an electrical device and these parts are normally handled by the user when the device is energized. A conventional method of protecting the user against such hazards is to ground the outer conductive parts of the device so that there cannot be any difference of potential across the user's body, from the device to ground, when he energizes and uses the device. To accomplish this purpose there are available polarized power outlets and mating connectors provided with corresponding ground terminals. In an electrical device having a connector with a ground terminal a low resistance conductor path connects the outer conductive metal parts of the device to the ground terminal of the connector. In a power supply circuit having an outlet with a ground terminal, a low resistance conductor path connects the ground terminal to ground. Thus, when the connector is joined to the outlet, the outer metal parts of the electrical device are connected to ground through a low resistance conductive path. However, the vital safety factor afforded by the ground terminals is compromised if the ground connection from the outlet terminal to ground is open or disconnected; the safety factor is drastically reduced if the ground connection is faulty and includes excessively high resistance in the form of a loose connection, a corroded terminal, or the like, or is on the verge of opening as where a ground connection is completed through a single strand.

An object of this invention is to provide a device for use in determining whether there is a conductive path between ground and the ground terminal of a power outlet and whether the electrical resistance of a conductive path between ground and the ground terminal of an electrical outlet exceeds a predetermined safe limit and whether the conductive path, even if otherwise satisfactory, is potentially faulty.

A further object is to provide a simple, compact, portable, inexpensive, safe, practical, reliable easy-to-use device that can check the quality of an outlet ground.

Figure 2:
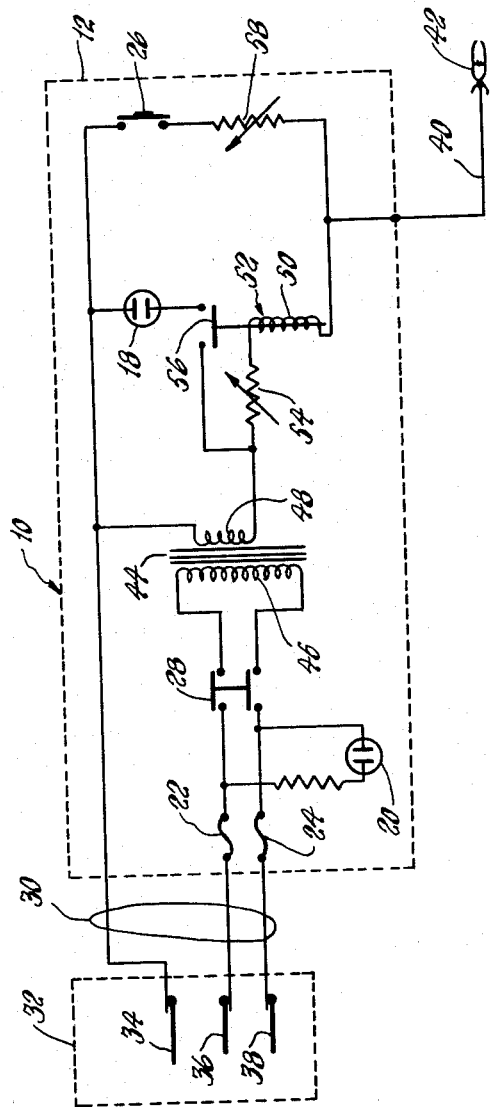
Figure 3:
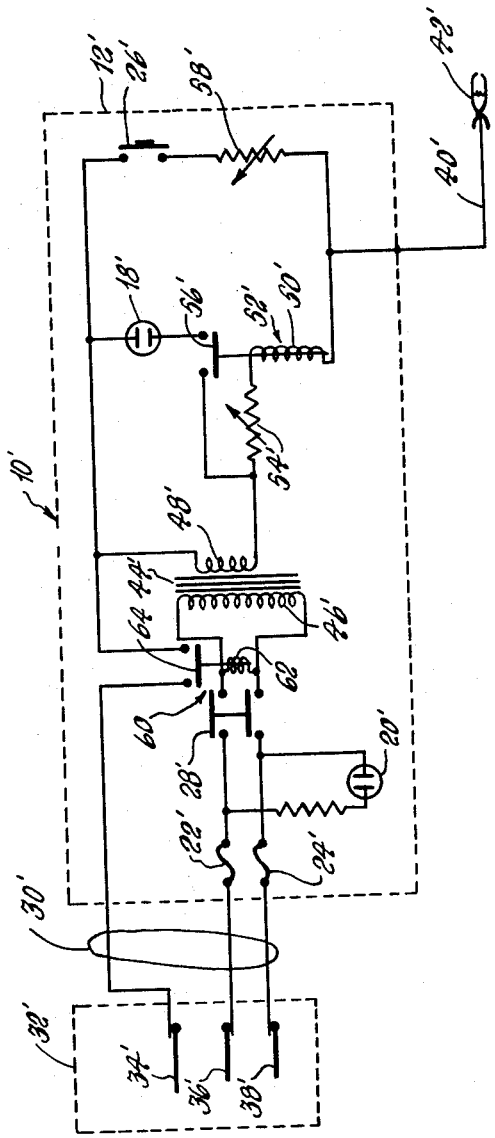

Other objects and many of the attendant advantages of this invention will be readily appreciated as the same becomes better understood by reference to the following detailed description when considered in connection with the accompanying drawings wherein:

FIG. 1 is a perspective view of an instrument embodying the principles of this invention connected to a power outlet and a grounded structure, both shown in broken lines, and FIGS. 2 and 3 are schematic circuit diagrams for the instrument shown in FIG. 1; the circuit in FIG. 3 includes a relay not in the circuit in FIG. 2.

An assembled test instrument 10 for 110–125 volt circuits is shown in FIG. 1 and includes a casing 12 with a carrying handle 14 and a front panel 16 through which project a ground circuit O.K. indicator lamp 18, a power supply indicator lamp 20, lines fuses 22 and 24, a push-button instrument-test switch 26 and a push button ground circuit test switch 28. A power cable 30 terminating in a polarized three-terminal plug 32 having a ground terminal 34 and power terminals 36 and 38, and a ground wire 40 terminating in an alligator clip 42 extend from within the casing 12. The plug 32 is of the type used in 110–125 volt single phase alternating current power supply circuits.

Within the casing there is mounted an isolation power transformer 44 having a primary winding 46 and a low resistance secondary winding 48 with a transformer turns ratio to step down the applied voltage to approximately 6 volts and wherein the secondary is capable of carrying on the order of 40 amperes for at least a brief time interval, on the order of one minute, without damage. The primary winding 46 is in series with terminals 36 and 38 of the connector 32, line fuses 22 and 24, and double-pole single-throw normally-open push button switch 28. Power supply indicator lamp 20 in series with a current limiting resistor is connected across the input power leads and is located between the fuses and the switch 28 and when the lamp is luminous it indicates that the outlet in which the plug is inserted is energized and that the instrument fuses 22 and 24 are in operating condition.

Coil 50 of a relay 52 and an adjustable current limiting power resistor 54, whose maximum resistance is less than one ohm, are connected in series between one terminal of the transformer secondary 48 and case 12 and ground wire 40, in common. The other terminal of the transformer secondary 48 is connected to the ground terminal 34 of the connector 32. Relay 50 includes a normally open switch 56 which is actuated to closed circuit position when at least a predetermined current passes through relay coil 50; relay switch 56 is in series with ground circuit indicator lamp 18 across the secondary winding 48.

The current limiting resistor 54 is adjusted to limit the maximum current through secondary 48 and relay coil 52 to a level which is non damaging to these components under the expected usage while it is not likely that current will flow longer than several seconds the design should anticipate at least one minute of current flow. The resistor adjustment is made by setting resistance 54 for maximum resistance, connecting an ammeter between the grounding clip 42 and that side of the secondary 48 which is connected to the ground terminal 34 of the plug, connecting the plug 32 to a power outlet energized at a prescribed voltage, e.g., 125 volts which is about the maximum voltage encountered in low voltage alternating current power circuits, pressing the push button of switch 28 to closed circuit position observing the ammeter, releasing the push button and reducing the resistance 54, repeating this procedure until the ammeter indicates the predetermined maximum safe current level through the transformer secondary 48 and the relay coil 52. If the combined resistance of the relay coil and of the secondary is sufficient to adequately limit the maximum current, the resistor 54 is omitted. The maximum current flow through the secondary should equal on the order of twice the current level required to cause the relay switch 58 to close to allow for a range of ground circuit resistance between plug terminal 34 and ground clip 42. A satisfactory range of ground circuit resistance on board steel ships for affording an adequate safety factor to personnel is 0–0.2 ohm.

The determination of maximum ground circuit resistance is based upon studies of let-go current has been found to be about 6–9 milliamperes, varying according to the individual and his physical condition at the time. Let-go current is defined as follows: if an individual grips an electrical appliance with his fingers closed around it and the current passing between the appliance and his hand exceeds the let-go current, the individual will not be able to open his hand to release the appliance merely by exercise of his will. Therefore, the ground circuit resistance should not exceed a value which when multiplied by a predetermined maximum current that may pass through the ground circuit will establish a difference of potential between the casing of the electrical appliance and ground sufficient to cause a current level exceeding let-go current to pass through the user's body under a set of conditions where he presents the lowest possible resistance between the appliance and ground. While the maximum resistance of the ground circuit varies with environments, it has been determined that on steel ships, where an appliance user might be standing in salt water and holding an appliance with perspired hands, the ground circuit resistance should not exceed 0.2 ohm.

The relay 52 is selected and adjusted to respond to a current level that the ground circuit must be able to carry without failing. In other words, if somewhere in the ground circuit one thin strand of wire completes the circuit, this condition is unsafe. The relay must pass enough current to sever unreliable connections of this type. For this purpose, a current level on the order of 20 amperes is recommended.

In general, the tester 10 must be designed so that when energized by a voltage within the limits prescribed for the instrument whether 110–125 volts or other limits, and with the maximum predetermined allowable ground circuit resistance connected between clip 42 and terminal 34, the current flow through coil 50 will be sufficient to close relay switch 56 and also will be sufficient to test the ground circuit for unreliable weak connections of low current carrying capacity. Also, if the resistance between clip 42 and terminal 34 is zero, the maximum current flow through secondary 48 and the coil 50 should not be so high as to damage this element if the current is continued for a selected brief period e.g., one minute. The turns ratio should produce a voltage across the secondary that is on the order of 6 volts for the safety of the user who may be expected to grip the clip 42 after the tester is energized.

The tester 10 further includes a test circuit for use in determining whether the instrument is operating; the test circuit includes switch 26 and an adjustable resistor 58 set to simulate the maximum allowable ground circuit resistance connected in series across the combination of secondary 48, resistor 54 and relay coil 50.

To use the tester 10 to test the ground connection in an alternating curret power outlet of the type described, the clip 42 is connected to a grounded structure adjacent the outlet with care exercised to establish good electrical contact therewith and then the connector 32 is inserted in the outlet tested. If the lamp 20 is not rendered luminous, the next step is to determine whether power is available at the outlet or whether one of the fuses 22 and 24 are bad. A quick method of checking the fuses is to plug the tester into an outlet that has been supplying power recently to another appliance. On the other hand, if the lamp 20 is rendered luminous when the connector 32 is inserted in the outlet tested, the switch 28 is actuated and the lamp 18 observed. If the lamp 18 is rendered luminous when switch 28 is actuated, the ground circuit is satisfactory; if lamp 18 is not rendered luminous, the ground circuit may be faulty or the instrument circuit may be faulty. The instrument circuit is checked by detaching the grounding clip and actuating switch 26 while the switch 28 remains actuated and if the lamp 18 is thus rendered luminous, the instrument is not faulty. In using the tester, the switch 28 is released in as brief a time as practical to avoid any possible overheating of secondary 48 and relay coil 50.

In using the tester 10, the clip 42 should always be attached to a grounded structure before the connector 32 is inserted into an outlet.

The circuit shown in FIG. 3 includes all the elements in the circuit shown in FIG. 2, designated by corresponding reference characters primed, and includes an additional safety feature, relay 60, having a relay coil 62 connected directly across the primary winding 46 and having normally open switch means 64 connected in series with the ground terminal of the connector 32. This safety feature contemplates a highly improbable occurrence. If the outlet tested is incorrectly wired and the ground terminal of the outlet is connected to a live line, and the connector 32 is inserted into an outlet before the clip 42 is connected to a grounded structure, the clip 42 and the case 12 of the tester shown in FIG. 2 would be at a substantially different potential than ground. The relay 60 obviates this possibility. The relay switch in FIG. 3 is closed only if full voltage, e.g., 110–125 volts, is applied across terminals 36 and 38. If ground terminal 34 is connected to one of the live lines of the power circuit, full voltage will not be available across the terminals 36 and 38, relay 60 will not be actuated and the switch 64 will remain open. The lamp 18 will not be rendered luminous when switch 28 is actuated or when switch 28 and switch 26 are actuated. The instructions for the user would be to extract the connector 32 and insert into another outlet to ascertain that the instrument is operating; if the instrument operates when connected to a second socket, the other outlet is ordered repaired.

The testers 10 and 10' are simple, compact, portable, inexpensive, safe, practical, reliable, equipment that can be easily used periodically to rapidly check all the outlets in an installation for faults and particularly for ground connections that are unsafe.

The embodiments illustrated are for single phase power circuits. The invention is applicable to three phase circuits and direct current circuits; for the latter the transformer is omitted and in its place is provided a battery supply. A self contained battery supply has obvious disadvantages in terms of weight, durability, cost, and the like, over the illustrated embodiments but it has an advantage in that an outlet ground can be tested where the outlet terminals are not energized.

Obviously many modifications and variations of the present invention are possible in the light of the above teachings. It is therefore to be understood that within the scope of the appended claims the invention may be practiced otherwise than as specifically described.

I claim:

1. An electrical continuity test instrument comprising a polarized three-terminal receptacle plug including a ground terminal and two power supply terminals for connection to an outlet receptacle having a ground terminal and a pair of power supply terminals having a particular A.C. voltage therebetween, a transformer having a primary winding and a high-current low-voltage secondary winding for developing about six volts when said A.C. voltage is across said primary winding, conductor means including manually-operable normally-open switch means connecting the two power supply terminals of the plug in series with the primary winding, a relay having a winding and normally separated contacts which are close-circuited when more than predetermined plurality of amperes flows through the relay winding, grounding means, conductor means connecting in series said ground terminal of the receptacle plug, said transformer secondary winding, said relay winding, and said grounding means and together having a total impedance equal to a minor fraction of an ohm and low enough to pass more than said plurality of amperes when energized by six volts, electrical indicator means, conductor means connecting in series said transformer secondary winding, said relay contacts and said indicator means whereby when said grounding means is connected to a grounded conductive structure and said plug is electrically connected to said receptacle and said switch is manually closed, said transformer is energized through said two power supply terminals in said plug and said switch, and said indicator is energized to indicate a proper ground only if the ground terminal of the receptacle is electrically connected to said grounding means through a conductive path whose impedance is a minor fraction of an ohm low enough to permit at least said plurality of amperes to flow through said relay winding at said A.C. voltage to cause the relay contacts to be close circuited.

2. An electrical continuity test instrument as defined in claim 1 further including a current limiting adjustable resistor having maximum resistance less than one ohm connected between and in series with said transformer secondary winding and said relay winding to limit current flow through said relay winding below a level likely to result in damage if said grounding means is connected to the ground terminal of said plug through a path of substantially zero resistance, and said transformer is energized by an A.C. supply at said predetermined voltage.

3. An electrical continuity test instrument as defined in claim 2 further including a voltage indicator connected across the two power terminals of said plug, and an instrument checking loop connected across the series-connected transformer secondary, current limiting resistor and relay winding, said loop including, in series, a second normally-open manually-operable switch and a second current limiting resistor having resistance on the order of less than one ohm to approximate the maximum resistance of a satisfactory ground circuit whereby when said grounding means is connected to a grounded conductive structure and said plug is connected to a receptacle as described and said switch in series with the primary is actuated, if said indicator means is not energized, said instrument may be checked by disconnecting said grounding means and by actuating both said switches concurrently and if said indicator is thus energized said instrument is operating.

4. An electrical continuity test instrument as defined in claim 3 further including a second relay having a winding connected across the primary winding of said transformer and having normally open contacts in series with said ground terminal that are close circuited when an A.C. power supply of said particular voltage is connected to said power supply terminals of said plug and are not close circuited if the power supply voltage is substantially less than said voltage.

5. An electrical continuity test instrument for use on a polarized three-terminal electrical outlet which if properly connected has two terminals at a predetermined difference of potential energized from an alternating current power supply and a third terminal connected to ground through substantially zero impedance, for checking whether the current carrying capacity of said grounded terminal exceeds a predetermined minimum plurality of amperes and for checking whether the impedance between the grounded terminal and ground is not in excess of a predetermined minor fraction of an ohm, comprising a polarized three terminal connector for conductive engagement with said outlet and having corresponding power and ground terminals, a power supply indicator lamp connected across the power terminals of said connector, an isolation transformer having a primary winding that is connected across the power terminals of said connector and a secondary winding for developing about six volts when said primary winding is energized by said alternating current power supply, a relay having a winding and normally open-circuited contacts which are close circuited when the current through said relay winding exceeds the predetermined minimum current carrying capacity of the grounded terminal of said outlet, grounding means, conductor means connecting in series said ground terminal of the plug, said transformer secondary winding said relay winding and said grounding means and together having a total impedance equal to a minor fraction of one ohm and low enough to permit at least said plurality of amperes to flow when energized by six volts, a ground indicator lamp circuit including said relay contacts, whereby when said grounding means is forced into very low resistance contact with a conductive grounded structure in the vicinity of said outlet and said connector is in conductive engagement with said outlet, if said power supply indicator lamp is energized said power supply terminals of said outlet are properly energized and if said ground indicator lamp circuit is energized and remains energized for longer than an instant said ground terminal of said outlet is a satisfactory and safe ground connection, and an instrument checking loop connected across the series-connected transformer secondary and relay winding, said loop including, in series, a normally-open manually-operable switch and a current limiting resistor having resistance on the order of a fraction of an ohm to approximate the impedance of a satisfactory ground connection between the ground terminal of said outlet and ground, whereby if said power supply indicator lamp circuit is energized and said ground indicator lamp is not energized, said grounding means is disconnected and said switch is actuated and if the ground indicator lamp circuit is energized, said instrument is operating properly.

6. An electrical continuity test instrument as defined in claim 5 further including a second relay having a winding connected across the transformer primary and having normally open-circuited contacts in series with the ground terminal of said connector and which contacts are close-circuited only if the voltage applied to the power terminals of said connector is the predetermined power supply voltage whereby if through wiring error the ground terminal of said outlet is energized, said second relay is not energized to protect from electric shock the user who may be holding the grounding means.

(References on following page)

References Cited by the Examiner

UNITED STATES PATENTS

| | | | |
|---|---|---|---|
| 2,448,026 | 8/48 | Grant et al. | 340—214 |
| 2,710,393 | 6/55 | Goldberg | 340—214 X |
| 2,858,507 | 10/58 | Liautaud et al. | 324—51 X |
| 3,040,211 | 6/62 | Caldwell | 324—255 XR |

FOREIGN PATENTS

| | | |
|---|---|---|
| 1,029,078 | 4/58 | Germany. |

OTHER REFERENCES

"Magnetic Control of Industrial Motors," Part 2, Alternating Current Motors, Gerhardt W. Herrmann, John Wiley & Sons, Inc., New York, 1961, page 22.

WALTER L. CARLSON, *Primary Examiner.*